United States Patent [19]

Considine

[11] Patent Number: 4,968,194
[45] Date of Patent: Nov. 6, 1990

[54] TAP CHUCK CRANK

[76] Inventor: John W. Considine, 23 Valley, Apt. 302, Mt. Clemens, Mich. 48043

[21] Appl. No.: 191,577

[22] Filed: May 9, 1988

[51] Int. Cl.$^5$ .............................................. B23G 1/44
[52] U.S. Cl. .............................. 408/241 R; 408/215; 10/123 R; 279/1 K; 81/16
[58] Field of Search ............... 408/1 R, 222, 214, 215, 408/239, 241 R, 75, 136; 81/16, 177.85, 177.5, 177.1, 489, 492; 10/129 R, 129 M, 140; 82/78, 33 R; 251/291; 403/328, 107, 108; 74/527, 528, 545; 279/17; 16/117, 118, 120

[56] References Cited

U.S. PATENT DOCUMENTS

| | | | |
|---|---|---|---|
| 167,165 | 8/1875 | Grant | 408/231 X |
| 2,463,728 | 3/1949 | Wallin | 74/528 |
| 2,826,950 | 3/1958 | McClintock | 81/16 |
| 3,179,430 | 4/1965 | Zierden | 279/123 |
| 3,653,780 | 4/1972 | Ammatuna | 408/241 R |
| 3,733,142 | 5/1973 | Hoglund | 408/42 |
| 3,788,760 | 1/1974 | Daniels | 408/130 |
| 3,804,544 | 4/1974 | Adams | 408/14 |
| 4,345,445 | 8/1982 | Warthen | 279/62 |
| 4,380,991 | 4/1983 | Richter et al. | 125/20 |
| 4,411,298 | 10/1983 | Ellingsen et al. | 403/328 X |
| 4,702,131 | 10/1987 | Snow | 81/177.5 |

FOREIGN PATENT DOCUMENTS 944563 12/1963 United Kingdom ........... 408/226 X Primary Examiner—Z. R. Blinsky
Assistant Examiner—Robert Schultz
Attorney, Agent, or Firm—Krass & Young

[57] ABSTRACT

A hand crank for use on a drill press mounted chuck during a tapping operation. The crank comprises a body having an aperture which permits the crank to be installed on and in surrounding relationship to the drill press chuck body. A spring biased pin enters into the wrench anchor hole of the chuck body to secure the crank to the chuck. The illustrated crank has four equally spaced radial arms.

2 Claims, 2 Drawing Sheets

TAP CHUCK CRANK

INTRODUCTION

This invention relates to tapping tools and methods and particularly to a manually operable crank device which is easily installed on a machine such as a drill press to manually rotate a tap which is held in the drill press chuck.

BACKGROUND OF THE INVENTION

Forming threads in a workpiece by means of a tap is well known to include the steps of (1) drilling a properly sized hole in the workpiece and (2) turning a tap into the hole to form the threads. While the drilling operation is usually carried out by means of a machine such as a drill press, the tapping operation is usually carried out in the small shop by hand. A hand-driven precision tap is disclosed in the Harold Snow U.S. Pat. No. 4,702,131 issued Oct. 27, 1987. The snow tap comprises a wrench body having three crank handles extending radially therefrom.

It is highly desirable for accuracy to mount the tap in the machine used to perform the drilling operation without unclamping or moving the workpiece; this ensures that the tap is properly aligned with the axis of the drilled hole. The S. Ammatuna U.S. Pat. No. 3,653,780 granted Apr. 4, 1972 discloses a hand crank mechanism which addresses this desirable end result. The Ammatuna mechanism is complex and comprises a hand crank, a tap holder and an axially-expansible bias spring all of which fit within a drill press chuck.

SUMMARY OF THE INVENTION

The present invention, from an apparatus standpoint, comprises a manually operable crank which can be easily slipped over and locked to a conventional drill press chuck so as to facilitate the hand turning of a chuck in the press during a tapping operation. This eliminates the need to unclamp and move a workpiece after a pilot hole has been drilled.

Briefly, the crank of the present invention comprises a body of rigid material which is provided with an aperture closely approximating the diameter of the chuck body so as to fit over and coaxial with the chuck body. Means such as one or more radially extending crank arms are further provided to facilitate the generation of sufficient turning torques to rotate the crank and the chuck during a normal tapping operation. In accordance with the invention, the crank body is further provided with a retractable locking pin which normally extends from the crank body into the center aperture such that it can be positioned within the radial hole in the chuck body which normally receives the pilot pin of the chuck wrench used to install and remove drills and taps in the chuck.

From a method standpoint, the invention is a manual tapping method which comprises the steps of (1) drilling a properly sized pilot hole in the workpiece, preferably after clamping the workpiece relative to the table of the drill press; (2) replacing the drill with a tap; and (3) mounting the manual crank on the tap by manipulating the crank around the outside of the chuck body and securing the crank to the chuck body by means of a retractable pin which extends into the tap wrench anchor hole.

DETAILED DESCRIPTION OF THE ILLUSTRATIVE EMBODIMENT

Figure 1:
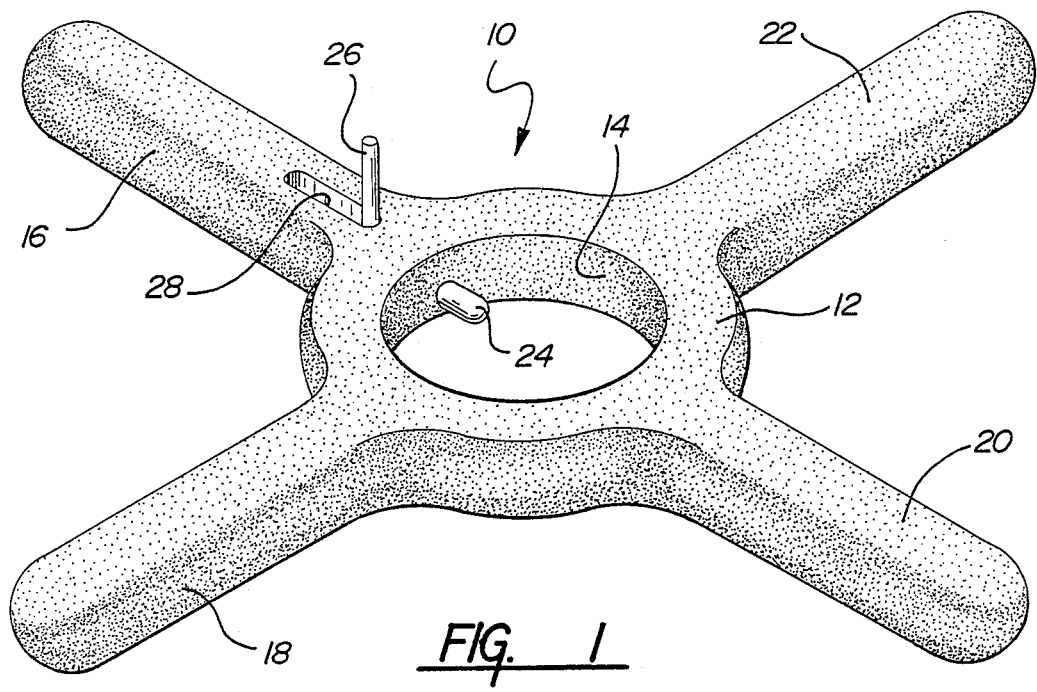
FIG. 1 is a perspective view of a tap crank made in accordance with the invention.
Figure 3:
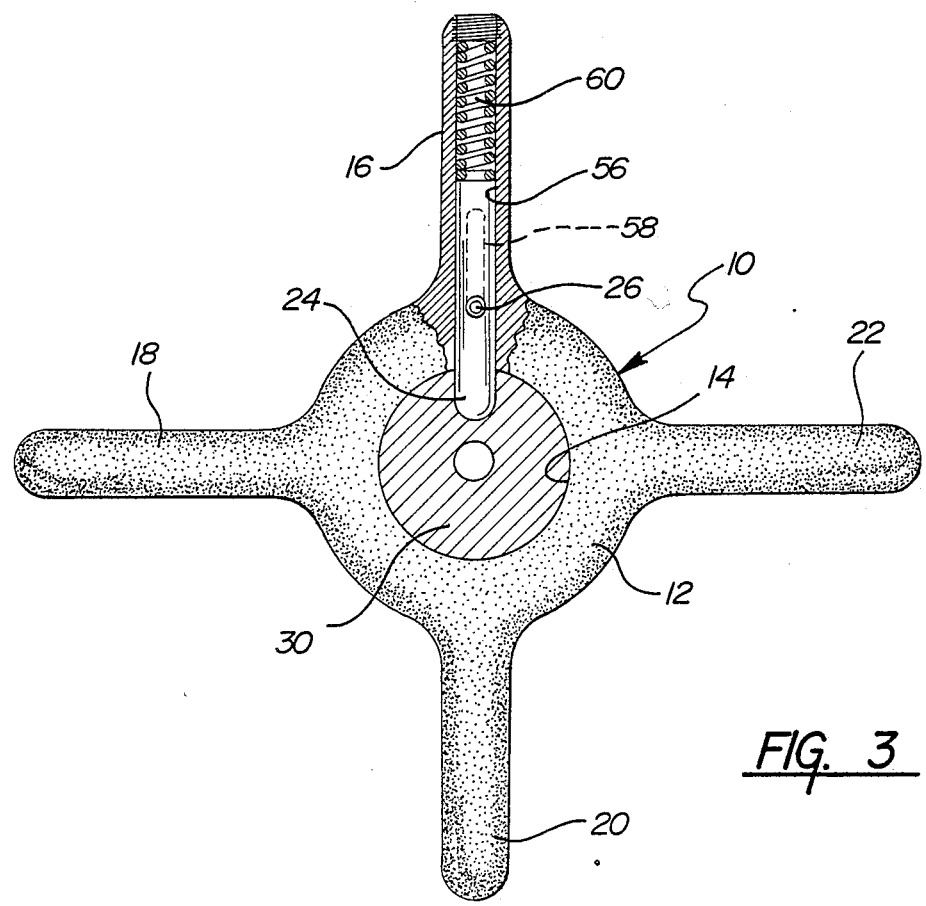
FIG. 3 is a perspective view of a drill press during a tapping operation with the tap crank of FIG. 1 shown in the installed position.
Figure 2:
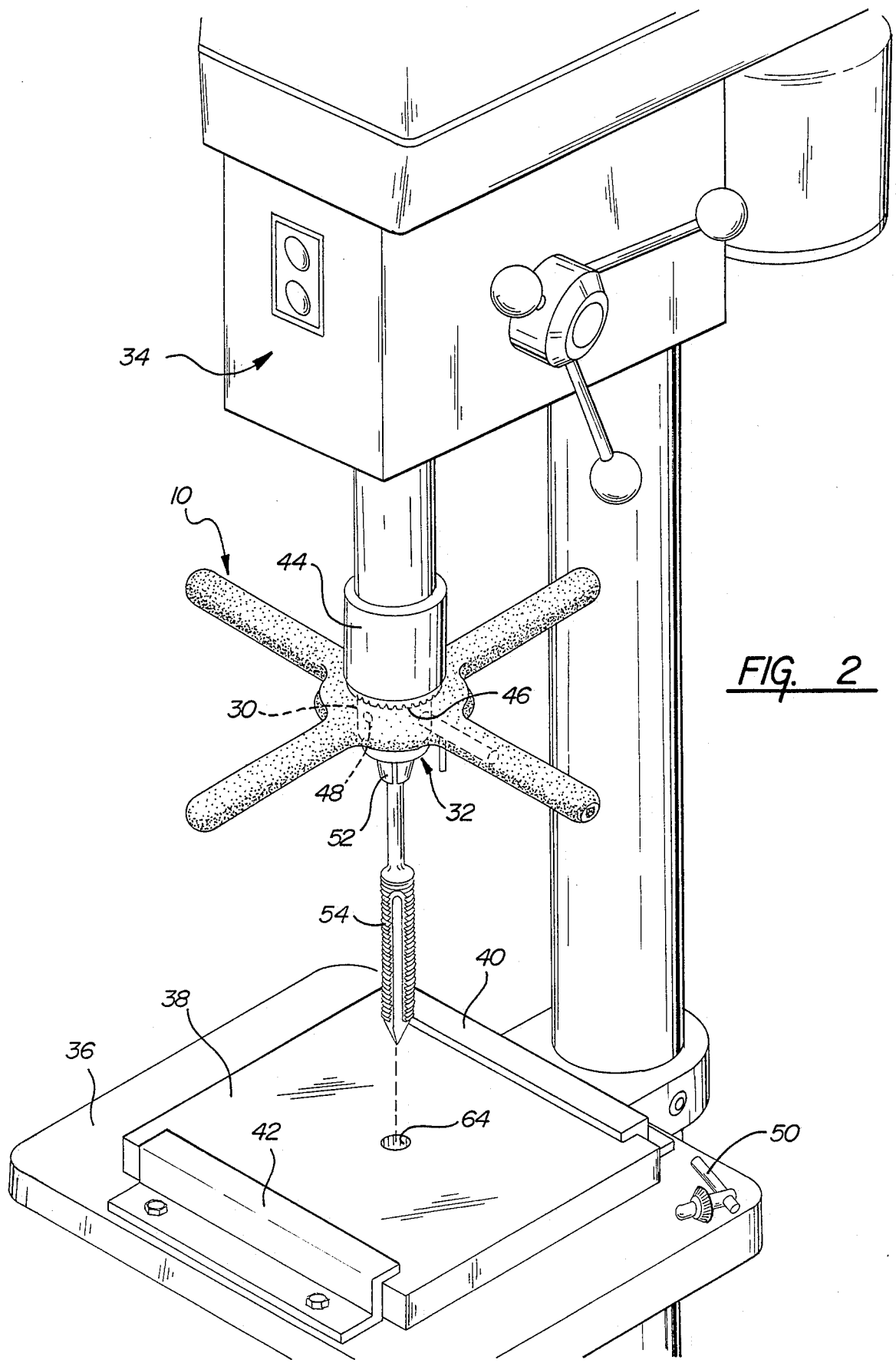
FIG. 2 is a plan view of the crank showing the operative relationship between the crank and the tap chuck body in the installed condition, and showing in section an internal detail.

Referring to FIGS. 1-3, a manual chuck crank 10 of rigid material such as a castable and/or machineable metal is shown to comprise an annular body 12 having a center aperture 14 and four equally spaced, integrally formed, radially extending crank arms 16, 18, 20 and 22. A locking pin 24 extends inwardly relative to the crank body 12 in radial alignment with and from crank arm 16 approximately 5/32 of an inch into the center aperture 14. Pin 24 may be retracted by a latch rod 26 which slides in a slot 28 against the force of a biased spring hereinafter described with specific reference to FIG. 3.

In an illustrative embodiment the crank 10 exhibits a center aperture 14 of 1 and ¾ inch diameter, a body diameter of approximately three inches and a overall diameter; i.e. from end to end of opposite crank arms, of eight inches. The material is cast aluminum.

Looking specifically to FIGS. 2 and 3, crank 10 is shown in association with the cylindrical body 30 of a conventional chuck 32 mounted in a state of the art drill press 34. The press 34 has a work table 36 on which a representative workpiece 38 is held by means of clamps 40 and 42.

Chuck 32 has a lock ring 44 mounted thereon. Ring 44 exhibits gear teeth 46 on the lower annular periphery thereof to receive a chuck wrench 50 which fits into an anchor hole 48 in the cylindrical body 30. In this case the hole 48 is located just below the teeth 46 so that the teeth of the wrench 50 firmly engage the teeth 46 of the ring 44 to open and close chuck jaws 52 to clamp and remove tools such as tap 54 and conventional drill bits (not shown).

As shown in FIG. 2, the crank 10 is secured to the cylindrical body 30 of chuck 32 by means of the aperture 14 and the pin 24. To install pin 24, a hole 56 is drilled axially through the crank arm 16 from the outside end fully therethrough so as to communicate with the aperture 14. The pin body 58, of which pin end 24 is a part, slides into the passageway formed by this drilling operation and the latch rod 26 is installed in a transverse hole, preferably using a friction fit. A compression spring 60 is dropped into the hole 56 behind the pin body 58 and a cap 62 is threaded into the hole 56 to capture the spring 60 and hold the assembly together.

Operation

The crank 10 is used in a tapping operation according to the following steps:

STEP ONE—A hole 64 is drilled by means of a conventional drill bit (not shown) held in the chuck 32 of the press 34 while the workpiece 38 is held on the table 36 by means of clamps 40 and 42. This is a fully conventional operation;

STEP TWO—The drill bit is removed from the chuck 32 using the wrench 50 and the tap 54 is installed. This is an entirely conventional operation;

STEP THREE—The crank 10 is manipulated into position on the chuck 32 by moving the crank upwardly over the tap 54, retracting the pin 24 against the action of the spring 60, manipulating the crank until the pin 24 lines up with the hole 48 in the chuck 32 and thereafter allowing the pin to snap into place in the hole 48; and STEP FOUR—The chuck 32 and the tap 54 are now manually turned by way of the crank arms 16, 18, 20 and 22 into the hole 64 formed in the workpiece 68 until a satisfactory set of threads is formed in the workpiece 38 by the tap 54.

It will be noted by those skilled in the machining art that the workpiece 38 remains in place on the table 36 during the entire operation, thus ensuring that the tap 54 is properly aligned with the hole 64 during the tapping operation. This is a result of the fact that the workpiece 38 is never moved between the drilling and tapping operations and that the tap 54 is held in the same chuck 32 as was used to hold the drill bit by which the hole 64 was formed.

The crank 10 may take various shapes and be made from various materials without departing from the spirit and scope of the present invention. For example, the crank arms 16,18,20,22 may be fewer or greater in number, of varying configurations and separable from the crank body. The pin 24 need not be aligned with a crank arm.

I claim:

1. For use with a power-driven drill chuck of the type having a cylindrical chuck body, a adjustable jaws for holding a tool, a rotatable ring mounted on the body and having gear teeth for adjusting the jaws to grip and release the tool, and a radial hole formed in said body for anchoring a chuck wrench engageable with said teeth, a manual chuck crank comprising:

a ring-like body of solid rigid material having a smooth, essentially uninterrupted center aperture configured to fit coaxially around and adjacent said chuck body;

at least two radial crank arms extending from the body for manually turning same;

a lock pin slidably mounted in a bore formed in said ring in alignment with and extending into one of said crank arms;

means in said bore for biasing said pin to extend into said aperture for entry into said chuck wrench anchor hole to positively lock the crank to the chuck, a slot formed in said body parallel to and communicating with said bore; and a manual pin retraction element positively and directly connected to said lock pin and extending through said slot from said body for directly manually retracting said pin from said aperture and substantially wholly into said body, said element also serving in combination with an end of said slot for providing a positive forward stop for said pin in the direction of said biasing means.

2. Apparatus as defined in claim 1 further including a bore formed completely and continuously through said ring body and one of said arms to provide a slide path for said pin, said biasing means comprising a spring in said bore, and said slot formed in said body and opening into said bore for receiving said element and providing said stop.

* * * * *